United States Patent [19]

Vasquez

[11] Patent Number: 4,744,274
[45] Date of Patent: May 17, 1988

[54] WAX RING PATTERN MACHINING TOOL

[76] Inventor: Eduardo C. Vasquez, 520 Palermo, Coral Gables, Fla. 33134

[21] Appl. No.: 10,729

[22] Filed: Feb. 4, 1987

[51] Int. Cl.⁴ .............................. B23B 3/02; B23B 5/00
[52] U.S. Cl. ............................................ 82/4 R; 82/18
[58] Field of Search .............. 408/196; 82/4 R, 34 A, 82/34 B, 1 C, 4 C, 18; 142/1, 43

[56] References Cited

U.S. PATENT DOCUMENTS

| | | | |
|---|---|---|---|
| 1,236,633 | 8/1917 | Wagner | 142/1 |
| 3,636,803 | 1/1972 | Miller | 82/4 C |
| 4,281,569 | 8/1981 | Kubiatowicz | 82/4 R |
| 4,353,154 | 10/1982 | Wagner | 82/4 C |
| 4,626,145 | 12/1986 | Vasquez | 408/196 |

Primary Examiner—Frederick R. Schmidt
Assistant Examiner—Blynn Shideler
Attorney, Agent, or Firm—Richard C. Litman

[57] ABSTRACT

A wax ring pattern machining tool which enables a goldsmith to create a precision machined wax ring pattern for subsequent casting in precious metal by the lost wax process. The machining operations on the ring pattern are carried out while the pattern is still a part of a wax ring preform tube. The machining tool may be employed to create circumferential grooves or channels on the exterior of the ring pattern or to reduce the diameter of the ring tube or otherwise shape it circumferentially. An indexing function is provided for securing the tool in a fixed radial position, permitting the use of a faceting tool for creating flat or beveled surfaces on the exterior of ring. Upon completion of the exterior design of the pattern, the tool is employed to size the ring and separate the ring pattern from the ring tube preform.

7 Claims, 4 Drawing Sheets

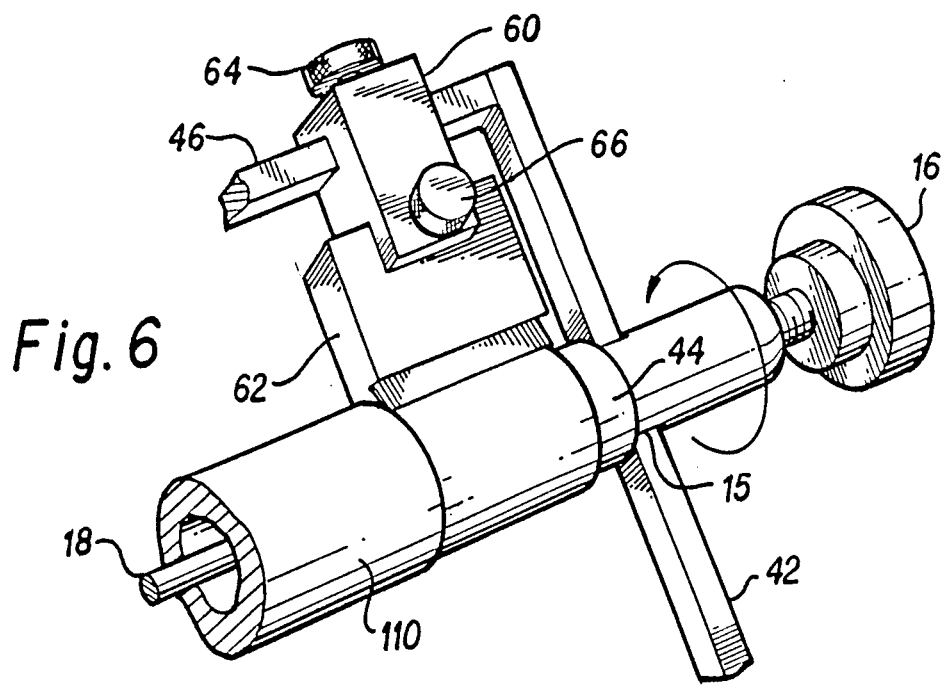
Fig. 6
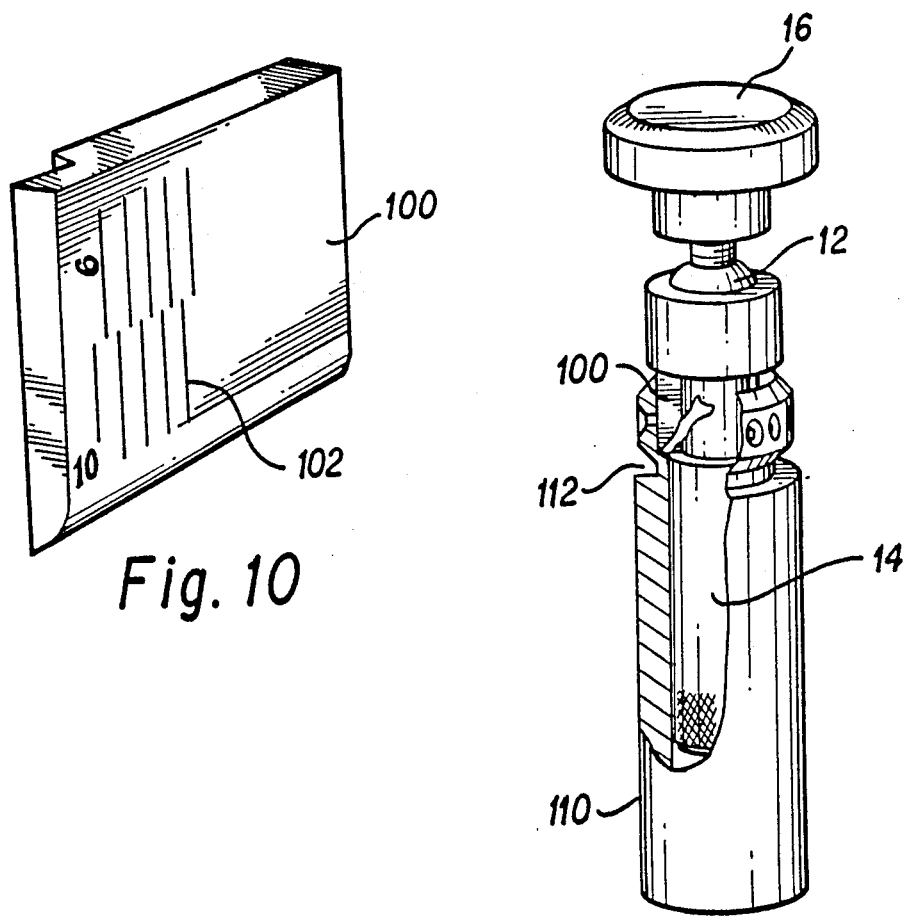
Fig. 10
Fig. 11

WAX RING PATTERN MACHINING TOOL

BACKGROUND OF THE INVENTION

The present invention relates to the precision machining of wax ring patterns for rings which are subsequently to be cast in precious metals by the lost wax investment casting process. Heretofore the forming of wax ring patterns was a manual process, involving the free-hand carving of the pattern by the jeweler or goldsmith and uniformity of the pattern was difficult to achieve. In a previous disclosure, now U.S. Pat. No. 4,626,145, which is fully incorporated herein by reference, I disclosed a wax ring preform sizing tool which the goldsmith could employ to size the interior of a wax ring pattern to a precise ring size with perfect concentricity with the outside of the pattern. The present invention discloses an improvement on that tool and adds indexing and machining functions which enable the goldsmith to index the tool in fixed radial positions, to file precise flat surfaces on the exterior of a wax ring preform, and to perform a variety of machining operations on the exterior of a wax ring pattern while the ring pattern is still a part of a wax ring preform tube. The tool enables the goldsmith to work on a wax ring pattern with machine shop precision with a simple hand tool.

No tools designed exclusively for working on wax ring patterns have been available to the trade before the invention of the wax ring preform sizing tool cited in the above referenced patent. The goldsmith began his operations to form a wax pattern by starting with a wax ring preform tube, a cylinder of wax having a bore size smaller than the smallest ring size. Wax ring preform tubes are supplied to the trade as cylinders from 6 to 12 inches long which may have bores which are not concentric with the exterior of the preform, e.g., cylinders with non-concentric bores or preforms having an extended flat surface. A wax ring pattern the width of the ring was cut from the preform tube and the goldsmith then proceeded to fashion a wax ring pattern by carving and shaping the the ring desired design and sizing the interior of the ring pattern to the required ring size using free hand carving and shaping techniques. The reference patent disclosed a tool which would size the interior of a wax ring pattern to the correct finger size while it was still a part of the wax ring preform. The present invention provides a pilot guided, indexable wax ring pattern machining tool which permits the goldsmith to machine the exterior of a wax ring pattern while it is still a part of the wax ring preform tube. The tool provides the goldsmith with the capability of indexing the tol in fixed radial positions, freely rotating the tool in order to perform various turning, shaping, facaeting and drilling operations on the exterior of the wax ring pattern attached to the ring preform tube.

SUMMARY OF THE INVENTION

The present invention discloses a pilot guided tool holder held at one end of a wax ring preform tube and connected by a shaft through the bore of the tube to a base plate inserted in the other end of the preform tube. An indexing gear secured to the shaft maintains the base plate in position and an indexing set screw may be used to engage a tooth on the gear to fix the tool holder in a fixed radial position. A slot in the body of the tool holder accepts a variety of L-shaped tool supports for holding tools for machining the exterior of the wax ring pattern. The tool support arms are secured in the slot by tightening the operating handle of the tool. With the indexing set screw disengaged, the tool is free to rotate and scraping, carving, or shaping tools attached to the tool supports may be employed to scrape or cut the exterior of the wax ring pattern to a desired pattern. When the exterior of the pattern has been completed the tool support is removed and the scraping blade of the tool is inserted in the slot and used to size the interior of the ring and to separate the ring pattern from the wax ring tube preform.

BRIEF DESCRIPTION OF THE DRAWINGS

FIG. 6 is a perspective view of the machining tool as it used with the flat blade to reduce the outside diameter of the ring pattern.

FIG. 10 is a side view showing the scraping blade for sizing the interior of the pattern.

FIG. 11 is a perspective view showing the machine tool employed with the scraping blade to size the ring and separate the pattern from the preform.

DESCRIPTION OF THE PREFERRED EMBODIMENTS

Figure 1:
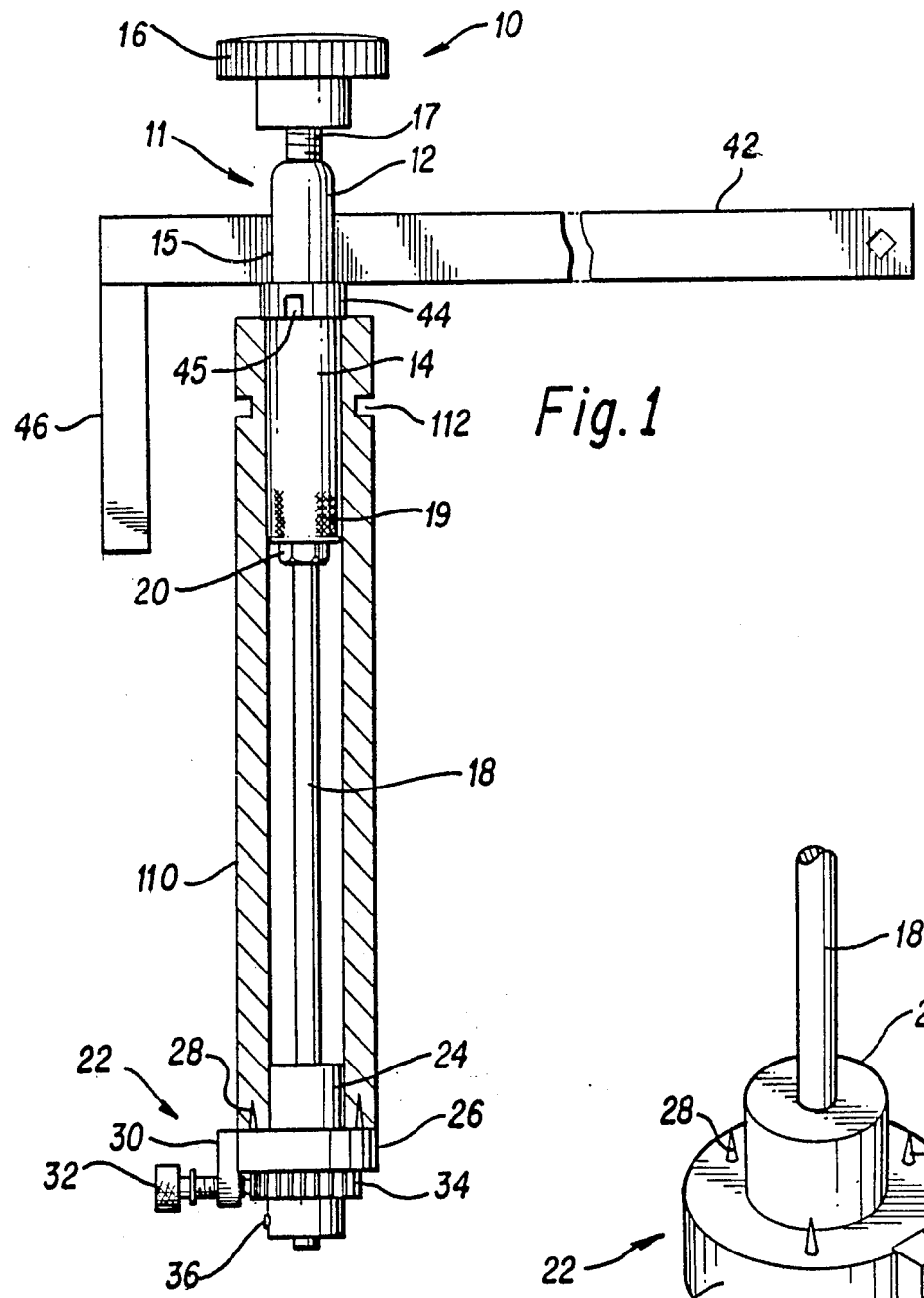
FIG. 1 is a side view showing the wax ring pattern machining tool with an indexing attachment installed on the wax ring preform tube which is shown in section.

Referring now to the drawings in which like numbers refer to like parts and now to FIG. 1 there is shown a wax ring pattern machine tool 10. A tool holder 11 is provided with a body 12 having a pilot member 14 which extends into the bore of the wax ring preform tube 110. A knurled section 19 on the end of pilot member 14 permits the pilot member to precisely size the bore of the preform tube to accomodate the tool. While wax preform tubes are supplied with a nominal bore of 0.605", small variations do occur during the forming process and the knurled section scrapes a uniform bore for operation of the tool as it is inserted into the bore of the ring preform tube. The body of tool holder 11 is provided with a slot 15 for receiving tools and tool supports which are secured in position by tightening operating handle 16 and screw 17.

Figure 2:
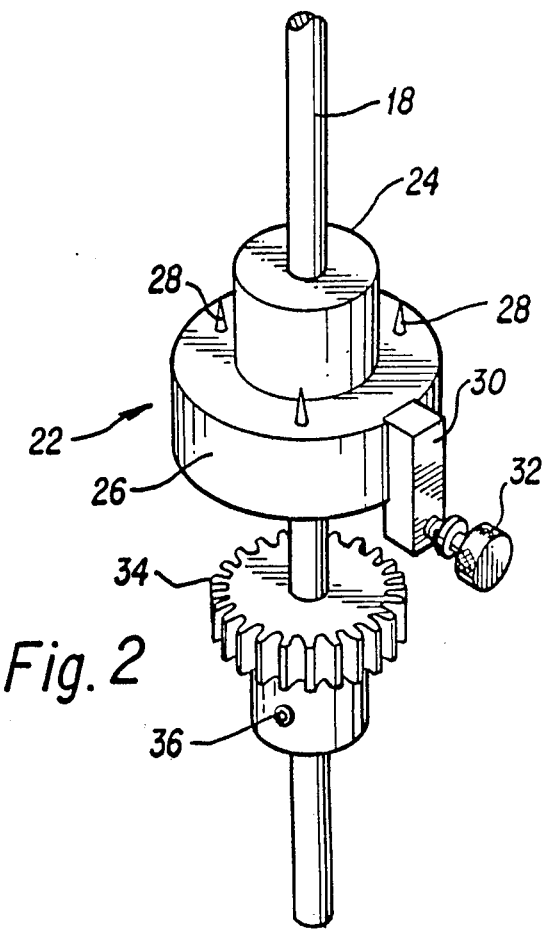
FIG. 2 is a perspective view of the base of the indexing attachment.

A shaft 18 is threaded into pilot member 14 and secured in place by tightening nut 20. Shaft 18 extends through the bore of preform tube 110 and beyond the end thereof. A base member 22 is installed on the shaft and moved until the base pilot member 24 enters the bore of the preform tube and the base 26 is in contact with the end of the ring preform tube. Small teeth 28 on the base are forced into the end of the preform tube preventing the base member from rotating. An indexing set screw bracket 30 on the base 26 holds an indexing set screw 32. An indexing gear 34 is installed on the shaft and moved into engagement with the base and secured in that position by tightening set screw 36. Referring now to FIG. 2 the assembly details of the indexing mechanism are shown.

Figure 3:
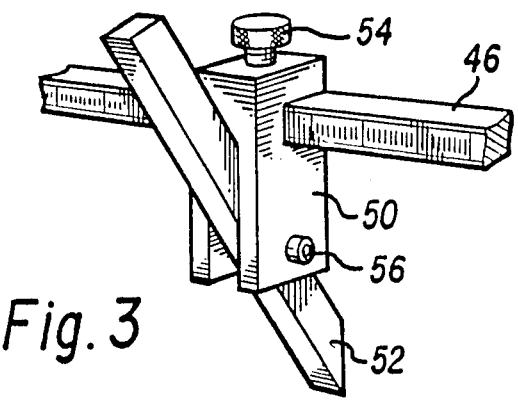
FIG. 3 is a perspective view of a graving tool support and graving tool.
Figure 4:
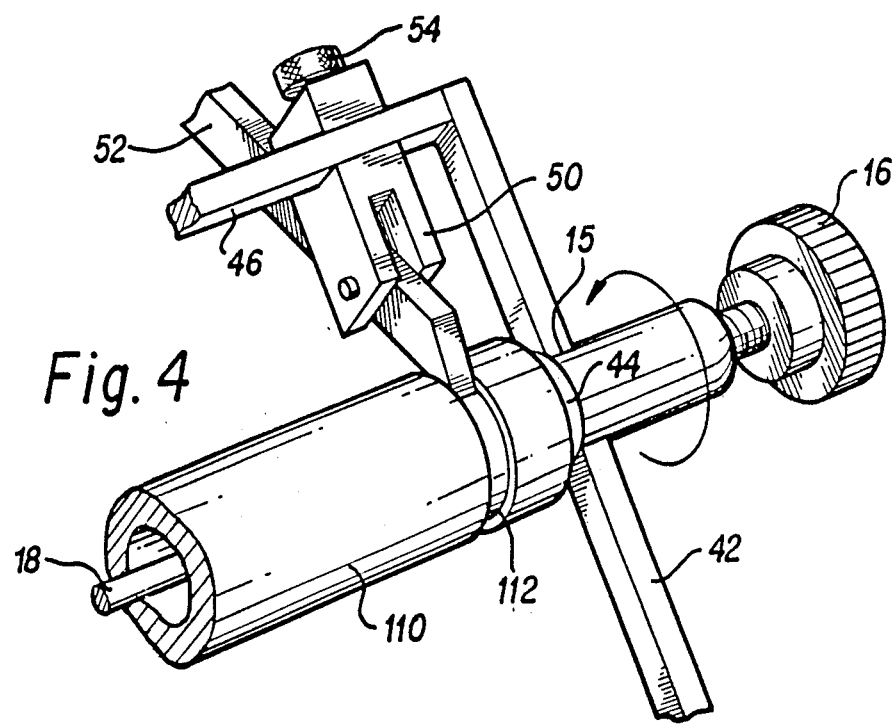
FIG. 4 is a perspective view of the machining tool as it used with the graving tool to make grooves in the ring pattern.

A tool support arm 42 may be inserted through slot 15 in the tool, supported away from the end of the wax preform tube by spacer ring 44 and secured in place by tightening the operating handle 16. The spacer ring may be provided with a slot 45 to enable the goldsmith to observe a ring size marking made on the end of the ring tube preform. The tool support arm 42 provides the means for holding and positioning a variety of tool supports and tools for machining the exterior of the wax ring pattern by attachment to the support arm L 46. Referring to FIG. 3 there is shown a graver blade tool support 50 which holds a graver blade and may be used to cut grooves or channels on the exterior of the pattern. The graver blade support is positioned at the desired vertical position on the tool support arm L 46 and secured in position by tightening set screw 54. A graver blade 52 which may have any desired shaped cutting edge is secured in the graver blade support by set screw 56. With the graver blade support and blade on the support arm L the goldsmith may, by rotating the tool and moving the graving tool into engagement with the wax preform tube, cut grooves, channels and make other narrow cuts on the exterior of the pattern as shown in FIG. 4.

Figure 5:
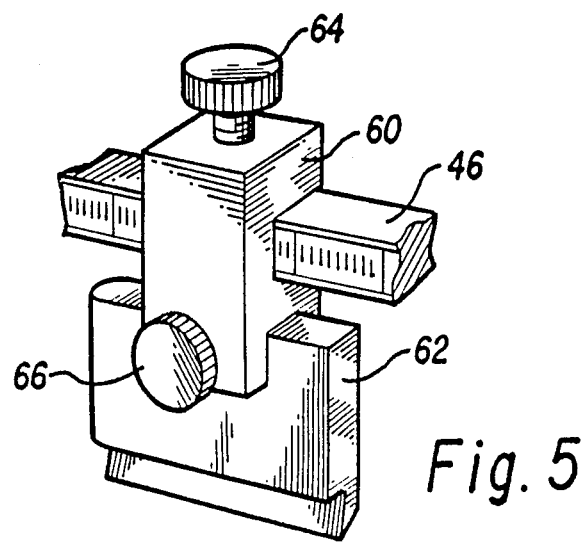
FIG. 5 is a perspective view of a flat blade tool support and scraping blade.

Referring to FIG. 5 there is shown a flat blade tool support 60 which holds a flat scraping blade 62. Flat blade tool support 60 is positioned on tool support arm L 46 and secured in the desired vertical position by tightening set screw 64. A flat blade 62 which may have a straight or rounded cutting edge is secured in the support by tightening set screw 66. With the flat blade tool support installed on the tool, the goldsmith can reduced the outside diameter of the ring pattern or make curved surfaces on the pattern depending upon the cutting blade shape, as shown in FIG. 6.

The foregoing free-turning operations are performed with the indexing set screw 32 disengaged from the indexing gear or they may be performed with the indexing tool removed from the tool holder. The attachments to be described are employed with the indexing tool to precisely index the tool holder in fixed radial positions.

Figure 7:
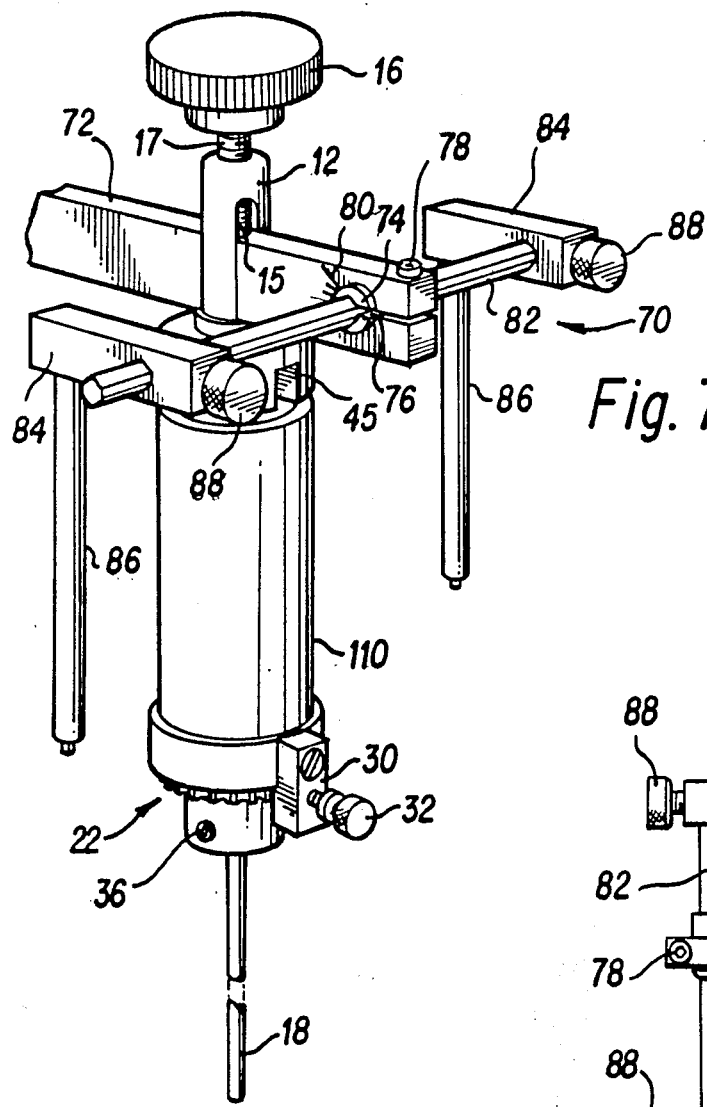
FIG. 7 is a perspective view of the tool with a faceting attachment and indexing attachment shown installed on a wax ring preform.

Referring now to FIG. 7 there is shown a faceting tool 70 which provides the goldsmith with the capability of machining flat surfaces on the exterior of the ring pattern. The tool support arm is removed from the tool holder and a faceting tool arm 72 is installed and secured in position by the operating handle 16. A rotatable collar 74 is provided with a slit 76 so that tightening lock screw 78 on the faceting tool arm secures the rotable collar in a fixed radial position. Indicia 80 on the faceting tool arm permit the setting of precise angles of the rotatable collar. A support arm 82 is inserted through the rotatable collar and supports file guides 84 which have extending file guide rollers 86. File guides 84 may be positioned along the support arm and secured in position by tightening set screws 88.

Figure 8:
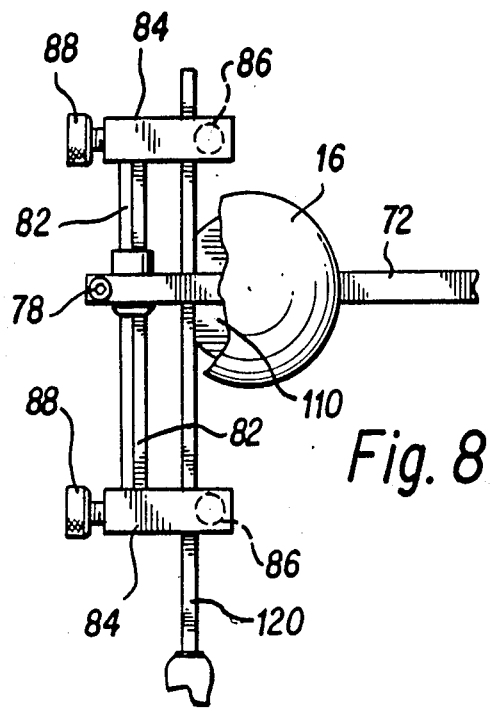
FIG. 8 is a top view of showing the faceting operation of a ring pattern.
Figure 9:
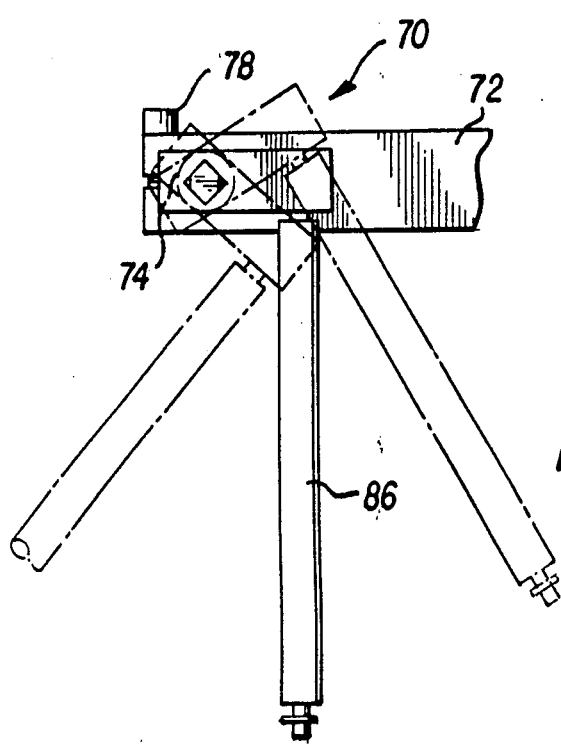
FIG. 9 is a side view showing the positioning of the file guide rollers of the faceting tool.

Referring to FIG. 8 there is shown the method of operation of the faceting tool. The file guides 84 are positioned to straddle the wax preform tube and the faceting tool arm is adjusted to provide a chord of the desired width across the surface of the wax pattern. A file 120 is then employed to file the pattern until the file engages the file guide rollers 86 which prohibit further inward movement of the file. The tool may then be re-indexed, using the indexing gear and set screw, and the filing operation repeated, if desired. FIG. 9 shows the rotatable movement of the collar 74 which positions the file guide rollers at an angle to the axis of the preform tube and wax pattern, permitting the filing of faceted, beveled flat surfaces on the ring pattern.

The indexing attachment also permits the use of other attachments with the holding tool to perform operations which require that the tool be fixed in position. Operations such as drilling and cutting axial grooves in the ring pattern may be performed using suitable tool supports and tools.

Referring now to FIG. 10 there is shown a scraping blade 100 which is employed to dimension the bore of the wax pattern to the desired ring size. Indicia 102 which are identified as ring sizes permit the goldsmith to set the blade in the tool holder to secure a desired internal diameter of the wax ring pattern. FIG. 11 shows the use of the scraping blade in the tool holder to dimension the bore of a completed ring pattern.

Having described the elements of the wax ring pattern machine tool the procedure for fashioning a ring pattern from a wax ring preform tube will be described. The goldsmith first employs the tool with the scraping blade installed as shown in FIG. 11 to make a small reference cut on the end of the preform tube showing the ring size. The scraping blade is then removed and the tool support arm 42 and spacer ring 44 are installed on the tool. The graver tool support and graving tool are installed on the tool support arm 46 and are used to make a channel cut in the ring preform tube to define the width of the ring pattern as shown by 112 in FIG. 1. The channel cut is made slightly deeper than the ring size as shown by the reference cut. The goldsmith then employs the various tool supports and tools to configure the outside of the ring to the desired pattern. When the machining of the exterior design of the ring pattern has been completed, the scraping blade is re-installed and used to dimension the interior of the pattern. The wax ring pattern separates from the ring preform tube when the scraping blade reaches the channel cut 112 which was made as the second step in the ring making process as may be seen in FIG. 11.

What is claimed is:

1. A tool for machining wax ring patterns from wax ring preform tubes while the ring pattern is a part of the tube comprising;

a tool holder having a body provided wtih a transverse slot therethrough adapted to receive cutting tool means, a pilot member on said body insertable into a first end of a wax preform tube bore, said pilot member having a periphery defining a sliding fit within the tube bore to precisely stabilize the tool holder during insertion of said pilot member into said tube first end, an operating handle axially disposed at one end of said body, indexing means having means manually operable to alternately secure said body adjacent said tube first end in selected fixed radial positions or allowing free rotation of said tool body relative the preform tube, said indexing means including a base having an axial bore juxtaposed a second end of said preform tube, securing means radially affixing said base to said preform tube second end, a shaft joined to said pilot member and having a distal portion slidably disposed through said base bore, an indexing gear provided with an axial bore slidably mountable upon said shaft distal portion adjacent said base, fastener means securing said gear to said shaft, said manually operable means on said indexing means including a lock member carried by said base and shiftable from a position engaging said indexing gear to a position free thereof, and cutting tool means including an elongated tool cross-arm insertable within said body transverse slot for selectively operating upon a surface of the preform tube, an elongated tool support carried by said tool cross-arm, a tool element mountable upon said tool support, screw means attached to said handle and threadedly disposed within said body in communication with said transverse slot for securing said elongated tool cross-arm therein adjacent said preform tube first end, whereby with said lock member not engaging said gear, said gear, shaft, pilot member and body are free to be rotated relative the preform tube so that said tool element may be utilized against the entire circumferential surface of the preform tube while, with said lock member in engagement with said gear, said gear, shaft, pilot member and body are radially locked relative the preform tube so that said tool element may be utilized to operate against but a selected radial portion of the preform tube.

2. The tool of claim 1 including,
a knurled surface on a portion of said pilot member periphery.

3. The tool of claim 1 wherein,
said tool support includes a graving tool support and said tool element comprises a graving tool whereby,
operation of the cutting tool means permits cutting grooves or channels in the ring pattern.

4. The tool of claim 1 wherein,
said tool support includes a flat blade holder and said tool element comprises a flat scraping blade whereby,
operation of the cutting tool means permits reducing the diameter of the ring pattern or shaping the pattern along its full width.

5. The tool of claim 1 wherein,
said tool support includes a support arm containing a pair of file guides,
said tool element including a pair of faceting guide rollers on said file guides along the axis of the ring preform tube so that when the file guide rollers are positioned to straddle the preform tube and the support arm is positioned to define a chord across the ring pattern a file may be used to file a flat facet on the patern until further inward movement of the file is prevented by engagement with both said file guide rollers.

6. A tool according to claim 5 including,
a rotatable collar mounting said support arm to said cross-arm and allowing positioning of said file guide rollers at angles to the axis of the ring pattern whereby the filing operation creates beveled surfaces on the ring pattern.

7. A tool according to claim 1 wherein,
said tool support is normal to said tool cross-arm and axially extends parallel to the axis of said preform tube.

* * * * *